United States Patent [19]

Krieger

[11] Patent Number: 4,460,536
[45] Date of Patent: Jul. 17, 1984

[54] LIFTING DEVICE FOR NUCLEAR POWER PLANTS

[75] Inventor: Friedrich Krieger, Würzburg, Fed. Rep. of Germany

[73] Assignee: Salzgitter AG, Salzgitter, Fed. Rep. of Germany

[21] Appl. No.: 273,802

[22] Filed: Jun. 15, 1981

[51] Int. Cl.³ ............................................. G21C 19/20
[52] U.S. Cl. ..................................... 376/268; 376/371
[58] Field of Search ................ 376/268, 271, 264, 260

[56] References Cited

U.S. PATENT DOCUMENTS

| | | | |
|---|---|---|---|
| 3,199,911 | 8/1965 | Alliot et al. | 376/264 |
| 3,388,942 | 6/1968 | Johnsson et al. | 376/264 |
| 4,279,699 | 7/1981 | Kuhn | 376/268 |

FOREIGN PATENT DOCUMENTS 1764176  1/1972  Fed. Rep. of Germany.
2308131  8/1974  Fed. Rep. of Germany.

Primary Examiner—Sal Cangialosi
Attorney, Agent, or Firm—Horst M. Kasper

[57] ABSTRACT

A lifting device for lifting and transporting nuclear fuel elements. This device comprises a mast-like support on the lower end of which automatically operated and locked gripping pawls are provided. The support has a considerable height and may be referred to as lifting mast. The gripping pawls and their operating mechanism are referred to as gripping-head. The gripping-head and the lifting mast are telescopically movable relative to each other. To this end guide rods and compression springs are interposed between the lower end of the lifting mast and the gripping-head. The gripping-head comprises two concentric annular members which are relatively movable or rotatable about their common geometrical axis. One of the annular members supports the gripping pawls pivotable in radial vertical planes. The gripping pawls are T-shaped. One of their transverse ends is adapted to engage the fuel rods, and the other of their transverse ends is adapted to engage curved grooves in the other annular member. The rotary motion of one annular member relative to the other effects pivotal opening and closing movements of the gripping pawls. In their limit positions the two annular members are blocked by a safety lever engaging slits or slots.

7 Claims, 9 Drawing Figures

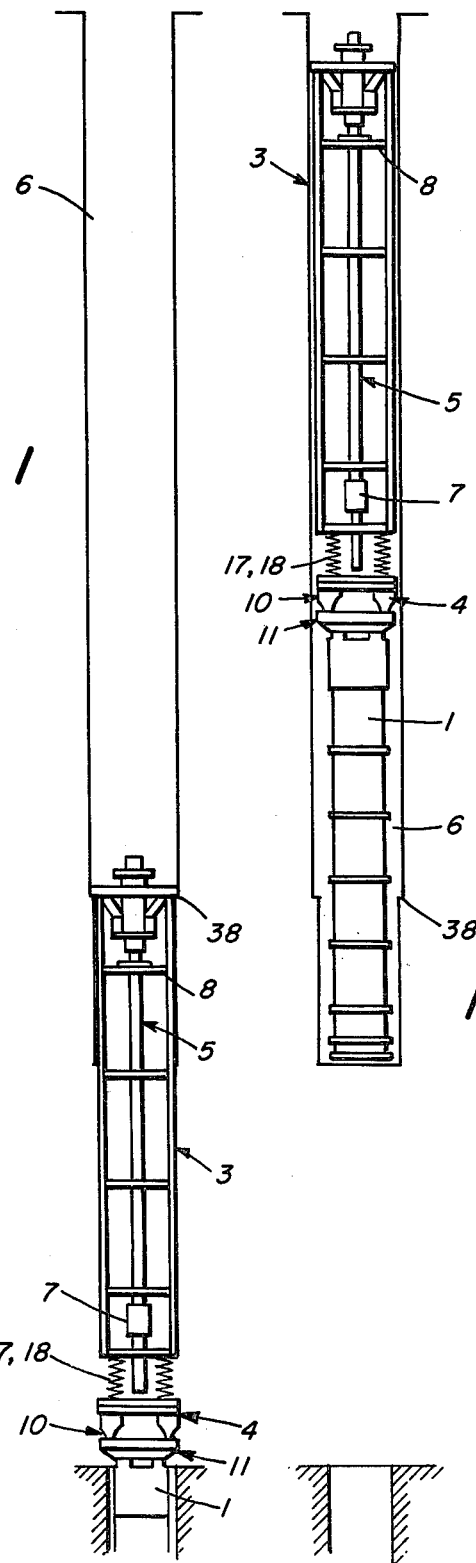
FIG. 1
FIG. 2
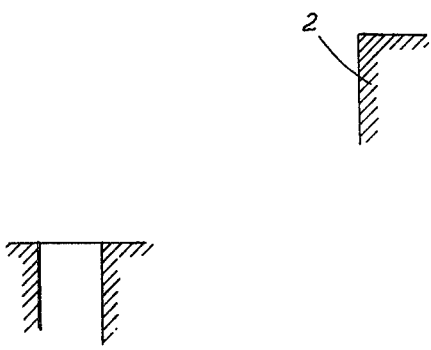

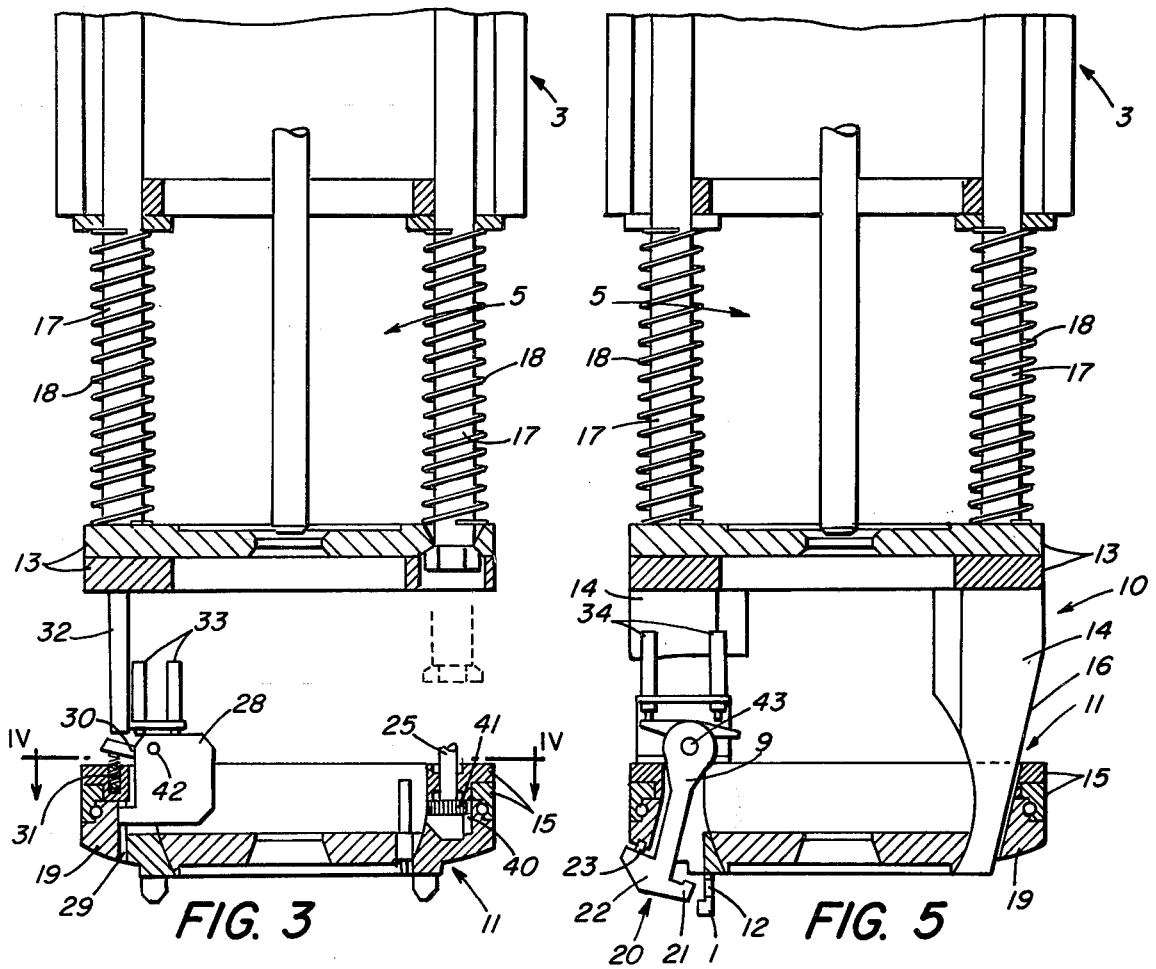
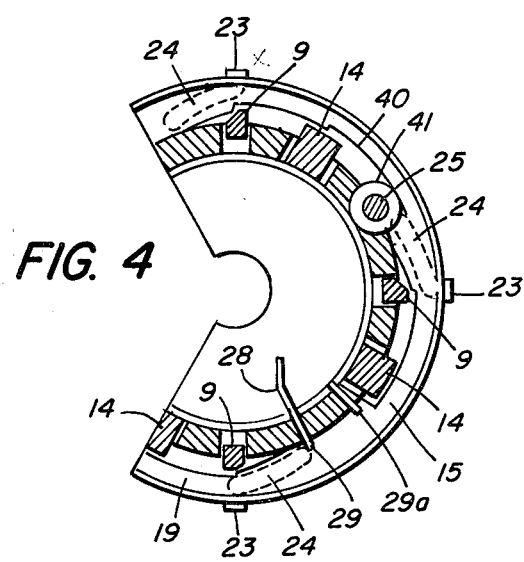
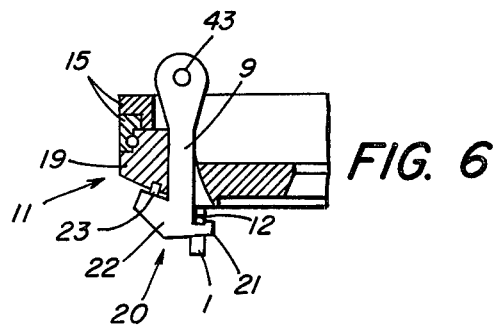

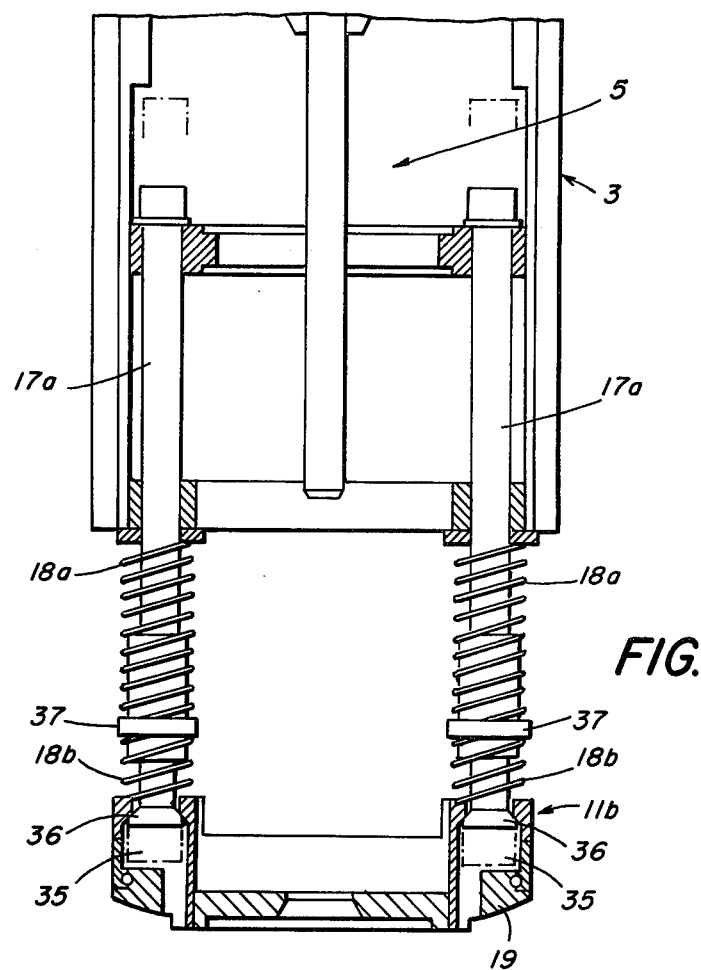
FIG. 7
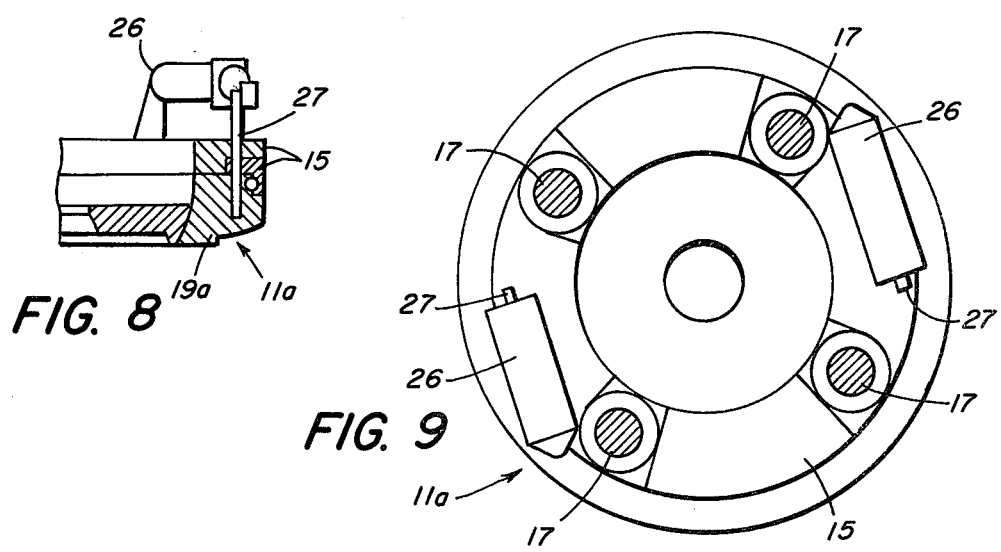
FIG. 8
FIG. 9

LIFTING DEVICE FOR NUCLEAR POWER PLANTS

BACKGROUND OF THE INVENTION AND PRIOR ART

This invention relates to devices for transporting fuel rods as used in atomic power plants, i.e. for transferring fuel rods from one given point to another. Such devices include a gripping head having gripping pawls adapted to engage recesses in the fuel rods intended to be lifted and moved from one point of origin to another desired point.

Among the known prior art devices those described in the German "Offenlegungsschrift" No. 2,308,131, and in German Pat. No. 1,764,176 appear closest to the present invention. The important differences between these prior art structures and the subject-matter of the present invention will be discussed below.

According to the German "Offenlegungsschrift" No. 2,308,131, the gripping pawls are pivotally mounted on a cylindrical housing which is referred-to as gripping head. They are pivotable in vertical planes. The gripping pawls are operated by motor means by the intermediary of short rods, the motor means being positioned on the top of the gripping head so that the spacing between the motor means and the gripping head is small. The gripping-housing-gripping-pawl unit is arranged in a hollow structure wherein it is movable between abutments. The movability of the unit between abutments serves the purpose of controlling locking devices for the gripping pawls in the limit positions thereof.

This design does not lend itself to situations where the spacing between the motor means and the gripping pawls is relatively large, because in such an instance the pawl-operating rods must be relatively long and may oscillate, unless restrained from so doing by special antioscillatory means.

The above referred-to German Pat. No. 1,764,176 describes lifting devices capable of handling fuel rods and including members which may be telescoped relative to each other. In this device the internal member must lift long auxiliary rods performing various functions and, therefore, sometimes referred-to as function rods, through the gripping-head. This arrangement precludes a close proximity of the drive motor and the gripping pawls of the gripping head. Another drawback of the above referred-to prior art gripping head is the relatively large horizontal cross-section of it which results from the bulk of the above referred-to function rods.

Still another drawback of the above referred-to prior art gripping head is that the locking organs for the gripping pawls are relatively inaccessible since they are arranged in the inside of the device.

The principal object of this invention is to provide lifting means for nuclear plants which are not subject to the limitation of prior art lifting means.

Another object of the present invention is to provide gripping heads supported by a support relative to which the gripping heads are movable, the gripping-head having gripping pawls pivotable in vertical planes for gripping the fuel elements of nuclear reactors which gripping heads are not subject to the above limitations and drawbacks of prior-art gripping devices.

Another object of the present invention is to provide gripping heads of the above description which are more compact than prior art gripping heads.

Still another object of the present invention is to provide gripping heads adapted to be used in connection with telescoping lifting devices.

A further object of this invention is to provide gripping heads wherein the parts for controlling the gripping pawls are readily visible and readily accessible.

These and other objects of the invention will become more apparent as this specification proceeds.

SUMMARY OF THE INVENTION

In structures according to this invention the gripping pawls are controlled by a double annular member or, to be more specific, by two concentric annular members. A first member is stationary, and a second member is rotatable relative to the first member about the joint geometrical axis of the first member and the second member. The first member pivotally supports a plurality of gripping pawls and further supports a locking lever or latch for determining limit positions of the rotarty motions of said second member relative to which said second member rotates about the joint geometrical axis of said first member and said second member.

A structure according to this invention includes also means for transmitting rotary motions of said second member to the gripping pawls supported by said first member.

BRIEF DESCRIPTION OF THE DRAWINGS

FIG. 1 is mainly a front elevation of a telescopic lifting device for a nuclear reactor in the lowered position thereof arranged in a tubular guiding member and engaging a fuel element;

FIG. 2 shows the same structure as FIG. 1 in the same fashion as FIG. 1 in the lifted position wherein the fuel element has been drawn into a guide tube;

FIG. 3 is mainly a longitudinal section through the gripping head for neclear fuel and of the support thereof, relative to which the gripping-head is movable, the section being taken along groove 29 of FIG. 4 and eliminating for the sake of clarity gripping pawls shown in FIG. 5;

FIG. 4 is a portion of a section along IV—IV of FIG. 3 seen in the direction of the arrows of FIG. 3;

FIG. 5 shows a longitudinal section of the gripping head in the open position of the gripping pawls where the latter are out of engagement with the nuclear fuel element;

FIG. 6 is a detail of the structure of FIG. 5 wherein the gripping pawls for engaging the nuclear fuel element have been pivoted to a position wherein they engage the nuclear fuel element;

FIG. 7 shows a detail of another arrangement including a gripping head on the end of its support relative to which the gripping-head is movable;

FIG. 8 shows in front view a mode of operating the gripping pawls which differs from that shown in FIGS. 5 and 6; and FIG. 9 is a top-plan view of the structure of which a part is shown in FIG. 8.

DESCRIPTION OF PREFERRED EMBODIMENTS

In a nuclear plant fuel elements 1 are supposed to be transferred to a storage structure 2 which is arranged at a higher level, or vice versa. To this end a telescoping unit is provided which comprises the supporting structure 3 and the gripping-head 4 arranged at the lower end of supporting structure or mast 3.

The gripping-head 4 proper grips the fuel elements 1.

The structure further includes a rod-gripping device 5 for lifting rods performing various functions and, therefore, sometimes referred-to as function rods. All parts forming the telescoping unit 3,4 are movable inside of a tubular guiding structure 6. In the upper position of the structure which may be moved inside of guiding structure 6 a mechanism may be released when a part 7 of the function rod-gripping device abuts against a bridge member 8. The preponderant length of support member 3 may be occupied by functions rods (not shown), The function rods are pulled through gripping head 4 into the structure 3. The mechanism 5 for lifting the function rods will not be described in detail since it does not form part of the present invention. It may also be mentioned that since part 3 is occupied by function rods when lifting the same, the space within part 3 is not available for other parts.

According to FIGS. 3-6 the gripping head 4 is arranged on the lower end of a mast-like support 3. Gripping-head 4 includes a frame structure 10 comprising horizontal flanges 13 and ribs 14. The latter project in radially inward direction. As indicated in FIG. 5, a plurality of ribs 14 may project from flanges 13, e.g. four such ribs. A double ring 11 is provided near the lower ends of ribs 14 and supported by them. This double ring 11 comprises a stationary portion 15 and a rotatable portion 19. Rotatable portion 19 may rotate relative to the stationary portion 15 about their common geometrical axis arranged in the center of portions 15 and 19, and at right angles to the planes defined by portions 15 and 19. Stationary portion 15 is supported by ribs 14 in such a fashion as to allow a limited pivotal ball-joint or tumbling movement between there two parts. This tumbling movement is limited to about 2°, and serves the purpose of allowing an adjustment of the plane defined by the points of support of the gripping pawls 9 of the gripping-head 4 to the plane defined by the points of support of fuel elements 1 which may slightly deviate from each other. The aforementioned tumbling movement is limited by the outer edges of ribs 14 which abut against the non-rotatable portion 15.

The frame 10 is slidably connected by guide rods 17 with the mast-like support 3. FIG. 3 indicates the relative movement of mast-like support 3 and flanges 13. The rods 17 project through flanges 13 and guide the latter when a relative movement of both is effected. Compression springs 18 surrounding rods 17 are interposed between flanges 13 and mast-support 3.

Now the operation of the structure which forms the gist of the present invention will be described.

The pivotable part, i.e. the part 19 is allowed to pivot, or rotate, relative to part 15 for a limited angle, and operates a plurality of gripping pawls 9. Normally a device includes a plurality of equidistant gripping pawls of which but one has been shown in FIGS. 5 and 6. Gripping pawls 9 are essentially hammer-shaped or T-shaped, including a handle end, or web end, which is pivotally suspended at a point 43, above the plane defined by fixed ring 15, and a hammerhead-shaped end arranged at a lower level than the handle end. The upper ends of T-shaped parts 9 may be considered as webs and the lower ends as flanges. Thus gripping pawls 9 are suspended at one of their webs and project with their handle ends through the rotatable or pivotable annular part 19. Reference numeral 21 has been applied to indicate the ends of gripping pawls 9 intended to engage the fuel rod. Reference numeral 22 has been applied to indicate the rear end of the head of operating pawls 9 which supports an upward pointing control pin 23. The latter engages a control groove 24 provided in the lower end surface of part 19. FIG. 4 shows three of four such grooves 24. FIG. 5 shows the gripping pawls 9 in their open positions in which their ends 21 are disengaged from a nuclear fuel block 1. FIG. 4 shows that control grooves 24 extend in anti-clockwise direction, i.e. their closed ends are situated to the right of their open ends where control pins 23 are located. If part 19 effects a partial rotary motion in clockwise direction, the gripping pawls 9 are forced to their closed position shown in FIG. 6. A drive must be provided to pivot gripping pawls 9 from their open to their closed positions. There are a number of mechanisms suitable to perform this task, i.e. to impart a partial pivotal motion to part 19. One such mechanism has been illustrated in FIG. 3 and another such mechanism has been illustrated in FIGS. 8 and 9. The mechanism of FIG. 3 is of mechanical nature and that of FIGS. 8 and 9 of a hydraulic nature.

As shown in FIG. 3, the rotatable part 19 is provided with an internal gear 40 meshing with a pinion 41 supported by a shaft 25. Shaft 25 is driven by a motor not shown. This enables to change the positions of gripping pawls 9 from open (FIG. 5) to closed (FIG. 6), and vice versa.

A device according to this invention is further provided with means for positively stopping or arresting the rotatable or pivotable part 19 in either of its two limit positions. To achieve this end a limit lever 28 is pivotally mounted on stationary annular member 15, as has been shown in FIG. 4. In FIG. 3 the point about which lever 28 is pivotable has been marked by numeral 42. Limit lever 28 is provided with a radially outwardly extending arm 30 acted upon by a helical spring 31, thus biasing lever 28 in clockwise direction, as seen in FIG. 3. Slots 29a define the two limit positions of rotatable part 19. Lever 28 cooperates with a spring-biased plunger 32 which is adapted to operate arm 30 of pivotable lever 28. Plunger 32 is affixed to mast-like structure 3. The limit positions of gripping pawls 9 and of lever 28 are sensed by electric switches 33 and 34 which secure these limit positions by electric means not shown and not forming part of the present invention.

When the lifting device is lowered, the spacing between mast-like support 3 and the gripping head 4 is maximal on account of the action of compression springs 17 and the gripping pawls 9 are in their open positions shown in FIG. 5. In this condition they are mechanically secured by the rotatable part 19 and by lever 28 engaging slot 29.

When the gripping head 4 is further lowered, plunger 32 engages arm 30 of lever 28 and pivots the latter about pin 40 in counterclockwise direction. This occurs at the moment when the gripping head 4 engages fuel element 1 and the device is further lowered. When the mast-like support 3 engages an abutment 38 on guide tube 6, the operating mechanism of the gripping head 4 is de-energized and stops.

When a nuclear element is intended to be lifted, pinion 41 operates the pivotable part 19, i.e. the part which may be rotated about a limited angle. This causes the gripping pawls 9 to engage the openings 12 in fuel element 1 intended to receive the axially inner ends 21 of pawls 9. The lifting operation of a fuel element 1 is accompanied by the entry of an edge of lever 28 into slot 29a which causes blocking of pawls 9 before fuel elements 1 may be lifted.

Referring now to FIG. 7, numeral 11b has beem applied to designate a dual ring, such as dual ring 11 shown in FIGS. 3,5 and 6. Ring 11b is provided with cavities 35 for receiving the heads 36 of bolts 17a guided in the support structure 3. The cavities 35 allow within certain limits a lateral displacement of dual ring 11b. Such a displacement may be necessary, or desirable, because the points of engagement 12 of fuel elements 1 (see FIGS. 5 and 6) may be displaced on account of thermal deformation.

Now the operation of the deivce which has been described above, will be explained.

The structure of FIG. 7 distinguishes also in another respect from that of the previous figures. Spring means are interposed between parts 3 and 11b. However, these spring means are subdivided into relatively long springs 18a surrounding bolt 17a and a relatively short spring 18b surrounding bolt 17b. The ends of both springs 18a, 18b rest against a collar or flange 37 of bolt 17a. The force exerted by a unit of length of spring 18a is larger than the force exerted by a unit of length of spring 18b. To put it in another way, spring 18a is longer and stronger than spring 18b. When the dual ring 11b and the parts associated with it engage fuel element 1 at first compression springs 18b, first compression springs 18b are compressed. If the downward movement of part 3 is not interrupted in time, the compression springs 18a are also compressed and bolts 17a are simultaneously raised, which initiates an emergency disconnection of the fuel lifting device.

FIGS. 8 and 9 show a modification of the gripping devices illustrated and described in connection with the preceding figures. The motor means for operating the gripping pawls 9 shown in FIGS. 8 and 9 are piston-and-cylinder motors 26. The operating ends of these motor means 26 are provided with vertical arms or rods 27. Arms or rods 27 are connected with the rotatable part 19a of dual ring 11a. Thus the rotatable part 19a of dual ring 11a may be rotated relative to the fixed part 15 thereof. In FIGS. 8 and 9 the proximity of motor 26 to the pivotal gripping pawls (not shown) will be particularly evident.

It will be also apparent from the above, that in drawing FIGS. 8 and 9 in substance the same reference characters have been applied to designate like parts, as in the preceding figures.

I claim:

1. A gripping head slidably arranged on a mast-like support, said gripping head having gripping pawls pivotable in vertical planes and for gripping the fuel element of a nuclear reactor, wherein said gripping-head comprises
   (a) a pair of substantially horizontal members;
   (b) one of said pair of members being fixed;
   (c) the other of said pair of members being rotatable relative to said fixed member about a common geometrical axis at right angles to the planes defined by said pair of members;
   (d) a plurality of substantially hammer-shaped gripping pawls each pivotally suspended on the handle-like end thereof by said fixed member;
   (e) each of said plurality of gripping pawls further having a hammerhead-like end having a front portion and a rear portion.
   (f) said front portion being for engaging nuclear fuel elements;
   (g) grooves in the underside of the rotatable member, each of said grooves being for controlling the rear portion of said gripping pawls so that each of said gripping pawls is pivoted about the point of suspension thereof in response to movements of said rotatable member relative to said fixed member; and
   (h) a pivotable latch on said fixed member selectively engaging a pair of spaced slits on said rotatable member for arresting the rotation of said rotatable member in two predetermined limit positions thereof.

2. Device as specified in claim 1 wherein the spacing of said grooves from said geometrical axis decreases from the points of entrance of said grooves to the ends thereof.

3. A device as specified in claim 1 wherein said means for arresting the rotation of said rotatable member include
   (a) a pair of slits whose spacing is determined by the length of said grooves and determines said predetermined limit positions of said rotatable member;
   (b) a pivotable latch member for selectively engaging said pair of slits;
   (c) an arm projecting from said latch member;
   (d) a spring acting on one side of said arm tending to pivot said latch member into one of said pair of slits;
   (e) a spring-biased plunger on said mast-like support for engaging the other side of said arm against the action of said spring; and
   (f) said spring becoming effective and causing engagement of one of said pair of slits by said latch upon increase of the spacing between said gripping-head and its mast-like support.

4. A device as specified in claim 1 comprising
   (a) a frame structure including horizontal flanges and ribs extending radially inwardly from said flanges and forming substantially portions of a solid of revolution;
   (b) vertical rods extending from said mast-like support through circular apertures in said flanges allowing vertical movements of said flanges relative to said mast-like support thereof;
   (c) each of said rods being surrounded by a helical compression spring having one end resting against said mast-like support and the other end resting against said flanges; and
   (d) the lower ends of said ribs engaging said fixed member in a ball-joint-like fashion to allow a limited tumbling motion of said fixed member relative to said lower ends of said ribs.

5. A device as specified in claim 1 wherein
   (a) said fixed member is provided with cavities receiving with radial play the lower ends of rods whose upper ends are slidably supported by said mast-like support; wherein
   (b) each of said rods is surrounded by compression springs situated to opposite sides of a collar on said rods; and
   (c) the springs between said fixed member and said collar being weaker than the springs interposed between said collar and mast-like support.

6. A gripping head for transporting nuclear fuel elements comprising
   (a) a pair of coaxial annular members;
   (b) one of said pair of members being fixed;

(c) the other of said pair of members being rotatable about the common geometrical axis of said pair of members;

(d) a plurality of T-shaped gripping pawls each having a web portion and a pair of flange portions, said plurality of T-shaped gripping pawls being equidistantly arranged around the periphery of said pair of members;

(e) each of said plurality of gripping pawls being pivotally suspended near the end of said web portion thereof by said fixed member;

(f) one of said flange portions of each of said plurality of gripping pawls being for gripping nuclear fuel elements;

(g) the other of said flange portions of each of said plurality of gripping pawls being for imparting reciprocating pivotal motions in vertical planes to each of said plurality of gripping pawls; and (h) a system of grooves in the lower end surface of said rotatable member controlling the motion of said plurality of gripping pawls.

7. A gripping head as specified in claim 6 having means for determining the limit positions of said movable member comprising (a) a pair of angularly displaced substantially radially extending slits provided in said fixed member, the spacing of said pair of slits being a measure of the permissible travel of said rotatable member relative to said fixed member;

(b) a flat lever for selectively engaging edgewise either of said pair of slits;

(c) an arm projecting from said lever and a spring acting against one surface of said arm and biasing said arm to enter one of said pair of slits;

(d) a spring biased plunger acting against the other surface of said arm and thereby precluding said spring to move said lever to engage said slits as long as said pair of annular members are at an intermediate point between the highest and the lowest elevation thereof.

* * * * *